United States Patent
Gulde et al.

(10) Patent No.: US 8,544,882 B2
(45) Date of Patent: Oct. 1, 2013

(54) PASSENGER FRONT AIRBAG

(75) Inventors: Alexander Gulde, Haimhausen (DE); Roland Peiz, Hilgertshausen (DE); Armin Kränzle, Deissen (DE); Peter Gerisch, Neufahrn (DE); Reinhard Böswirth, Hebertshausen (DE); Stefan Taubert, Friedberg (DE); Marc Schock, Karlsfeld (DE); Jens Hoffmann, Olching (DE); Anna Gawlowska, Lomnica (PL); Michal Skibinski, Pabianice (PL); Marcin Wiaderny, Wroclaw (PL); Marek Sofinski, Olawa (PL)

(73) Assignee: Autoliv Development AB, Värgärda (SE)

( * ) Notice: Subject to any disclaimer, the term of this patent is extended or adjusted under 35 U.S.C. 154(b) by 0 days.

(21) Appl. No.: 13/393,252

(22) PCT Filed: Sep. 2, 2010

(86) PCT No.: PCT/EP2010/005382
§ 371 (c)(1),
(2), (4) Date: May 2, 2012

(87) PCT Pub. No.: WO2011/026617
PCT Pub. Date: Mar. 10, 2011

(65) Prior Publication Data
US 2012/0205899 A1   Aug. 16, 2012

(30) Foreign Application Priority Data

Sep. 4, 2009   (DE) .......................... 10 2009 040 118

(51) Int. Cl.
*B60R 21/205*   (2011.01)

(52) U.S. Cl.
USPC ......................................... 280/732; 230/743.1

(58) Field of Classification Search
USPC .................. 280/728.1, 729, 732, 743.1, 801.1
See application file for complete search history.

(56) References Cited

U.S. PATENT DOCUMENTS 5,044,663 A * 9/1991 Seizert ........................ 280/730.1
5,094,476 A * 3/1992 Chihaya ...................... 280/743.1
(Continued)

FOREIGN PATENT DOCUMENTS

DE          3828072 A1     11/1989
DE       198 44 427 A1      4/2000
(Continued)

OTHER PUBLICATIONS

PCT International Search Report—Dec. 29, 2010.
(Continued)

*Primary Examiner* — Joseph Rocca
*Assistant Examiner* — Robert A Coker
(74) *Attorney, Agent, or Firm* — Brinks Hofer Gilson & Lione

(57) ABSTRACT

A front passenger airbag (5) is described for arrangement in the instrument panel (20) of a motor vehicle. It has an airbag envelope (10) having an impact area (11) and lateral surfaces extending from the impact area (11). In order to use small gas generators and to reduce the danger for a passenger in a non-standard seating position, the impact area (11) is nearly exclusively allocated to the front passenger's (I) head or head and shoulder area, the impact area (11) having a concave shape when the airbag envelope (10) is fully expanded and free of external forces, such that a left and right section of the impact area (11) respectively extend farther into the interior of the motor vehicle than a central section.

13 Claims, 6 Drawing Sheets

(56) References Cited

U.S. PATENT DOCUMENTS

| | | | |
|---|---|---|---|
| 5,213,361 A * | 5/1993 | Satoh et al. | 280/730.1 |
| 5,529,340 A * | 6/1996 | Fairbanks | 280/743.1 |
| 5,626,359 A * | 5/1997 | Steffens et al. | 280/735 |
| 5,934,701 A | 8/1999 | Furukawa | |
| 5,975,571 A * | 11/1999 | Ford et al. | 280/743.1 |
| 6,536,800 B2 * | 3/2003 | Kumagai et al. | 280/743.1 |
| 7,475,905 B2 * | 1/2009 | Klinkenberger | 280/743.1 |
| 7,516,979 B2 * | 4/2009 | Kokeguchi | 280/733 |
| 7,922,198 B2 * | 4/2011 | Urushibata | 280/743.1 |
| 2002/0017774 A1 | 2/2002 | Igawa | |
| 2002/0060449 A1 * | 5/2002 | Keshavaraj | 280/743.1 |
| 2005/0098994 A1 | 5/2005 | Matsumura | |
| 2006/0103118 A1 | 5/2006 | Hasebe | |
| 2006/0279072 A1 | 12/2006 | Hanawa et al. | |

FOREIGN PATENT DOCUMENTS

| | | |
|---|---|---|
| DE | 10 2007 029 650 A1 | 1/2009 |
| EP | 1 493 633 A1 | 1/2005 |
| EP | 1 693 256 B1 | 8/2008 |
| EP | 1 983 857 B1 | 7/2009 |

OTHER PUBLICATIONS

German Search Report—Nov. 11, 2010.

* cited by examiner

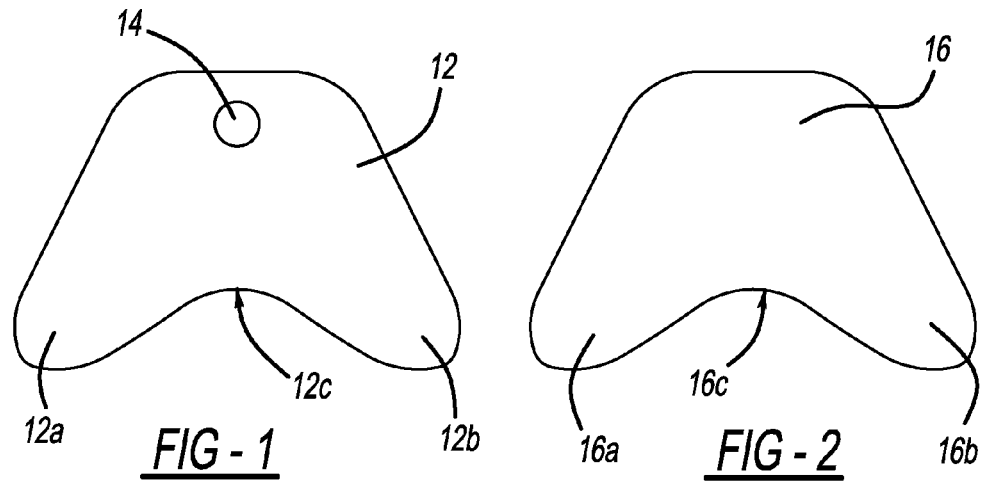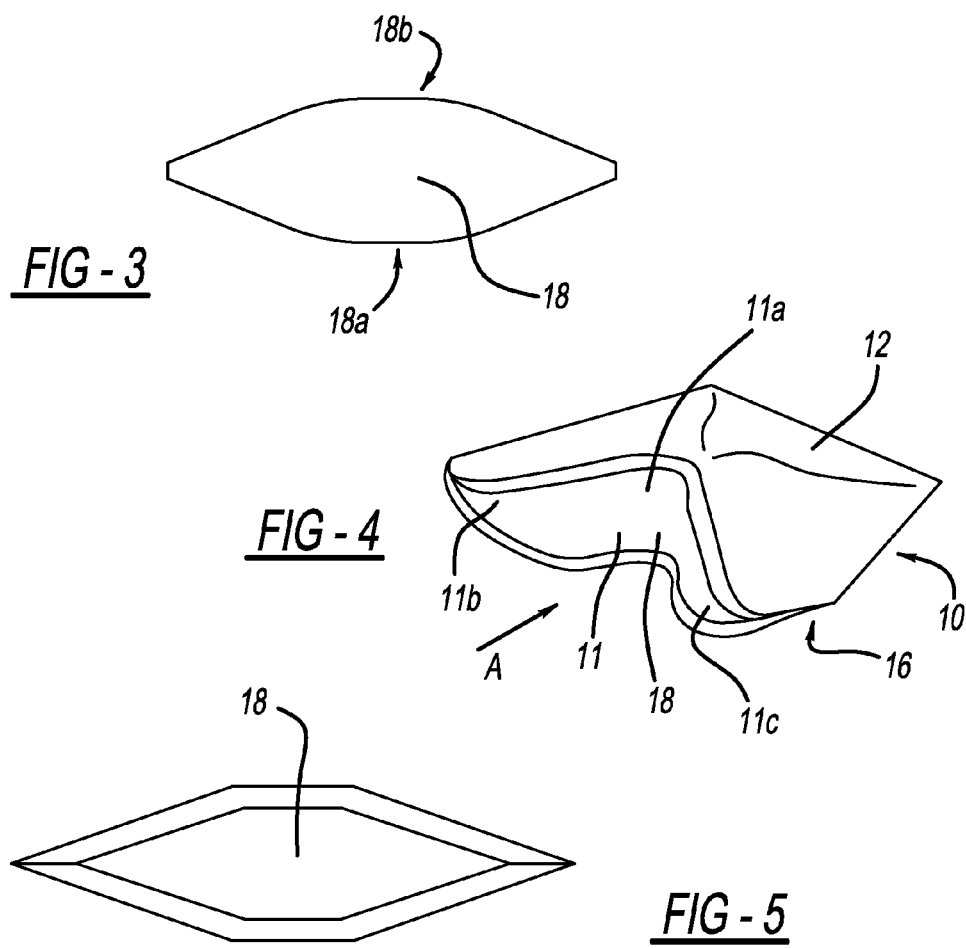

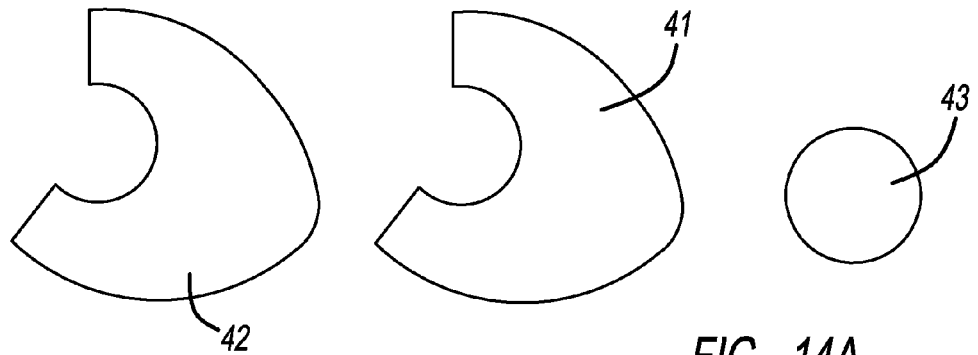
FIG - 14A
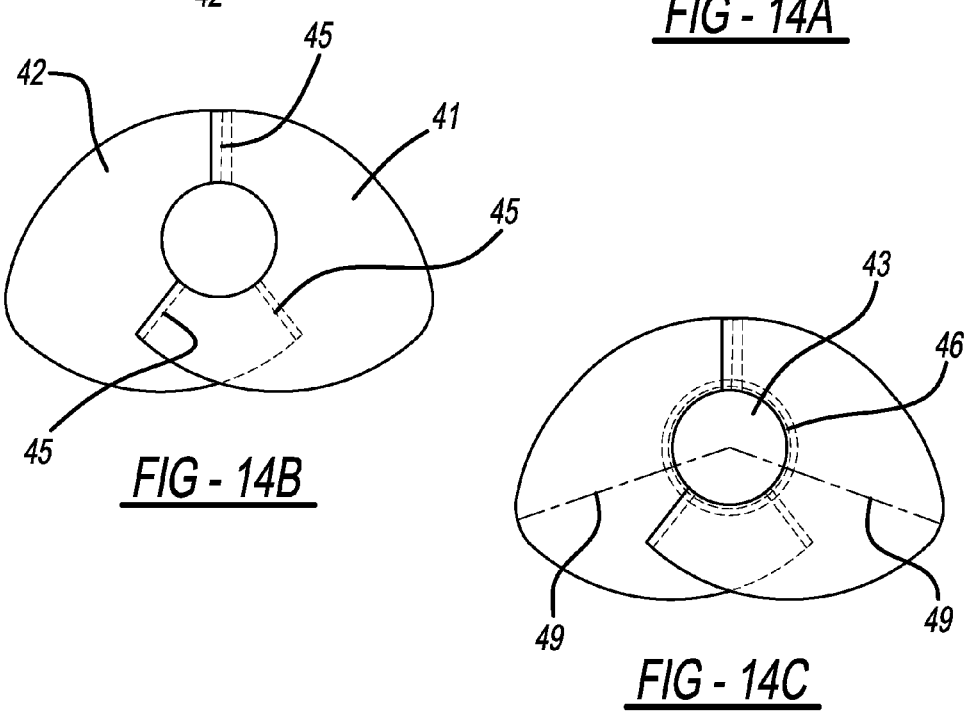
FIG - 14B
FIG - 14C
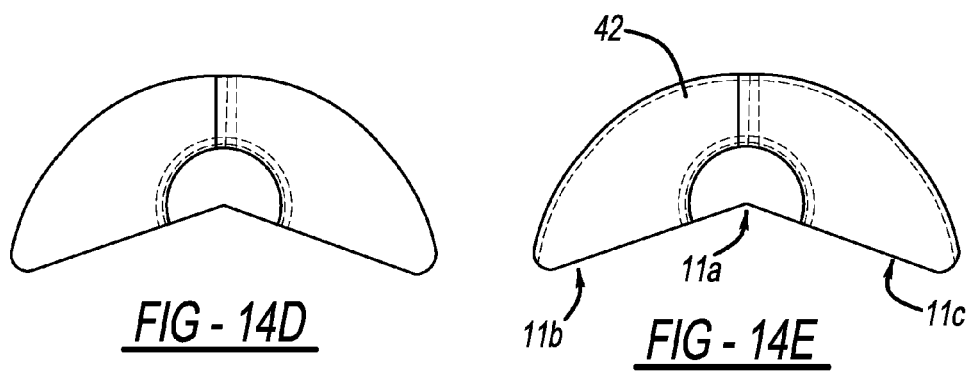
FIG - 14D
FIG - 14E

PASSENGER FRONT AIRBAG

CROSS REFERENCE TO RELATED APPLICATIONS

This application claims priority to German Patent Application No. 102009040118.0, filed Sep. 4, 2009, and PCT International Patent Application No. PCT/EP2010/005382, filed Sep. 2, 2010.

TECHNICAL FIELD OF THE INVENTION

The invention relates to a front passenger airbag as well as to a motor vehicle with such a front passenger airbag.

BACKGROUND OF THE INVENTION

So-called front passenger airbags are common in automotive engineering and are used to protect the front passenger, namely in particular to protect his/her head in case of a head-on collision or a laterally displaced head-on collision. Such a front passenger airbag is arranged in the dash panel—mostly in an upper area—and deploys between the instrument panel windscreen and the passengers when a head-on impact is detected.

The airbag envelopes of the current front passenger airbags have been designed with a large volume and thus cover the entire upper area of the instrument panel in front of the passenger. As a result, they provide very good protection because the head as well as the chest can be restrained by the front passenger airbag. Besides this advantage provided by a large-volume front passenger airbag, there are, however, also many disadvantages: Owing to the large volume, a correspondingly large and powerful gas generator has to be used, meaning a relatively large weight which is obviously always undesirable. Furthermore, large-volume front passenger airbags have to deploy very quickly in order to attain their full deployment in a timely manner. Consequently, the front passenger gas bag can be dangerous for the passenger if he/she is not in the standard seating position. A great deal of effort is expended to solve this problem, as is apparent from the extensive patent literature published in this regard.

SUMMARY OF THE INVENTION

Proceeding from the foregoing, the object of the present invention is to further develop a front passenger airbag such that the disadvantages described above are eliminated, or at least reduced.

Tests have demonstrated that, in the case of a seat-belted passenger, the part of the airbag envelope of the passenger front airbag which is allocated to the chest area, in many vehicle geometries is much less important for the protection of the passengers than the part of the airbag envelope that is allocated to the head or head and shoulder area. The reason for that is that the pelvic segment of the safety belt usually holds the pelvis in its initial position, so that movement of the upper part of the passenger's body is basically a tilting movement around the pelvis after the activation of the belt force limiter in case of a head-on impact. The function of restraining the upper part of the body can be achieved by the design of the force limiter. Owing to the fact that the surface of the instrument panel is relatively far from the passenger's head/chest area the contribution of the restraining effect that is provided by the front passenger airbag for the chest area is frequently not enough, even when applying the belt force limiter.

In many countries, in particular in Europe, the rate of seat belt use, also by front passengers, is so high that a belted front passenger has to be assumed when designing the front passenger airbag.

According to the present invention, the impact area of the airbag envelope is therefore nearly exclusively allocated to the front passenger's head or head and shoulder area. The airbag envelope of the front passenger airbag can thus be configured such that it comprises a relatively small volume, preferentially namely a maximum of 50 liters, in particular preferentially 35 to 50 liters. A somewhat larger volume of the airbag of around 60 liters may also be necessary for special applications and requirements. This somewhat larger volume (which, however, is still smaller than that of a standard front passenger airbag) can be necessary in particular in the following cases: On the one hand, if the airbag module is arranged in the uppermost area of the instrument panel close to the windscreen (so-called top mount), and on the other hand, if the front airbag is intended to provide a high degree of lateral protection in case of a laterally displaced head-on collision. In order to provide good protection in case of a laterally displaced head-on collision, the impact area of the airbag envelope of the front passenger airbag has a concave shape when it is fully expanded such that a left and a right section of the impact area respectively extends farther into the interior of the motor vehicle than the central section.

As a result of the small volume of the airbag, the weight thereof is considerably reduced and the danger for a passenger who is out of his/her standard seating position is significantly reduced.

As has already been mentioned, the front passenger airbag according to the present invention only provides an ideal protection to belted passengers. Owing to the fact that in many countries, for example in Germany, the rate of seat belt use is very high, the advantages provided by the front passenger airbag according to the present invention, in particular with regard to out-of-position situations, can statistically outweigh the disadvantages related to accidents with unbelted passengers.

In order to virtually totally exclude accident situations with an unbelted passenger it is preferred that the front passenger airbag only be installed in motor vehicles with a warning system for an unbelted passenger. Such warning systems are known and produce an acoustic signal if a passenger is not belted.

Further details of the invention will now be explained in more detail in connection with several illustrative embodiments with reference to FIGS. 1 to 13.

BRIEF DESCRIPTION OF THE DRAWINGS

In the drawings,

FIG. 1 shows a base pattern piece according to a first embodiment of the invention;

FIG. 2 shows a top pattern piece according to the first embodiment of the invention;

FIG. 3 shows a further pattern piece according to the first embodiment of the invention;

FIG. 4 shows a airbag envelope composed of the pattern pieces shown in FIGS. 1 to 3 when it is fully expanded;

FIG. 5 shows a top view from the direction A of the airbag envelope from FIG. 4;

FIGS. 14a to 14e show the production process of a second embodiment of an airbag envelope;

DESCRIPTION OF PREFERRED EMBODIMENTS

Figure 6:
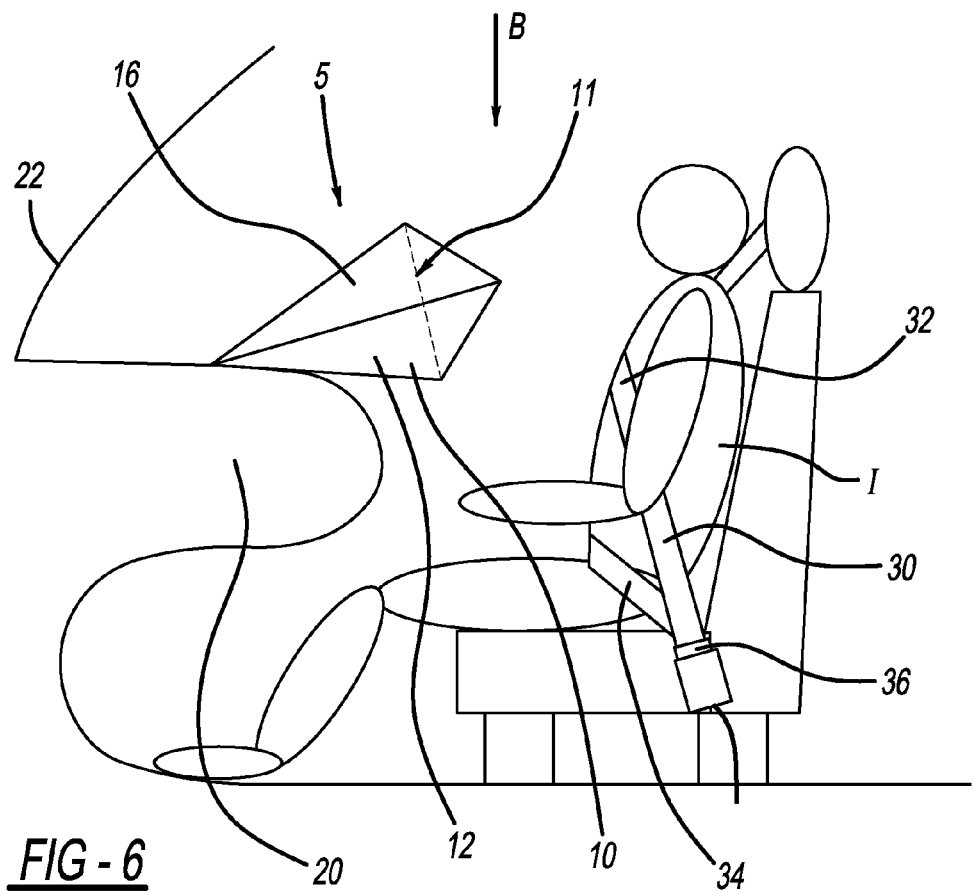
FIG. 6 shows a schematic cut across a front area of a motor vehicle with a front passenger airbag whose airbag envelope is shown fully expanded.

FIGS. 1-3 show the pattern pieces for the airbag envelope of a front passenger airbag. FIG. 1 shows a base cut pattern 12, FIG. 2 a top cut pattern 16 and FIG. 3 another cut pattern 18. The base cut pattern 12 and the top cut pattern 16 are congruent, with the exception that the base cut pattern 12 has a gas generator opening 14. An outflow opening is normally provided which can be designed for example as an opening in the top cut pattern 16 (not shown). The base cut pattern 12 and the top cut pattern 16 have each a first forward protruding section 12a, 16a, and a second forward protruding section 12b, 16b. A concave edge 12c and respectively 16c extends between both these sections. The other cut pattern 18 is basically lens-shaped, that is, double convex with a lower edge 18a and an upper edge 18b.

The just described three pattern pieces are sewn together such that the lower edge 18a of the other cut pattern 18 is sewn to the concave edge 12c of the base cut pattern 12 and the upper edge 18b of the other cut pattern 18 to the concave edge 16c of the top cut pattern 16. The remaining edge sections of the base cut pattern 12 and of the top cut pattern 16 are sewn to one another so that the airbag envelope 10 is closed and encloses a gas chamber. Instead of sewing, other joining methods can obviously also be used, like, in particular, welding or gluing.

FIG. 4 shows the airbag envelope 10 of the front passenger airbag 5 in the finished sewn expanded state. FIG. 5 shows a view from the direction A in FIG. 4. It is evident that the other cut pattern 18 is virtually identical to the impact area 11 and that the impact area has a concave shape such that in the mounted state a left section and a right section 11b, 11c of the impact area 11 extend farther into the interior of the motor vehicle than does a central section 11a. It is further visible that, owing to the lens-shape of the other cut pattern 18, the impact area has its maximal height in the center. The top and base pattern pieces 12, 16 form the lateral surfaces of the airbag envelope.

Figure 7:
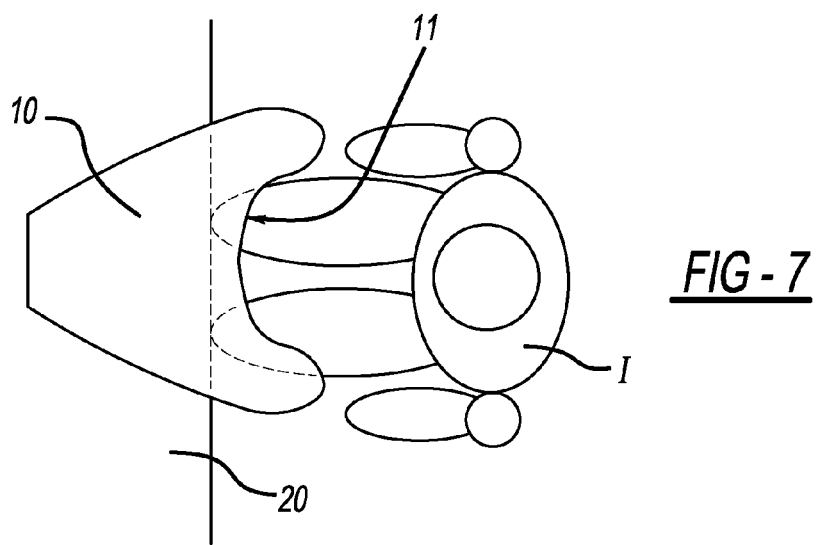
FIG. 7 shows a top view from the direction B of what is shown in FIG. 6, but without vehicle seat or safety belt.

FIGS. 6 and 7 show an airbag envelope 10, as has just been described, as a front passenger airbag 5 mounted in a fully expanded state on the instrument panel of a motor vehicle. It is evident that the base cut pattern 12 makes contact with the surface of the instrument panel 20 in sections, and that the airbag envelope 10 extends from there to the interior of the motor vehicle in the direction of the passenger I. The impact area 11 of the expanded airbag envelope is fully positioned above the instrument panel and thus also is exclusively allocated to the head of passenger I.

As is apparent from FIG. 6, the passenger to be protected is belted, namely by means of a safety belt 30 which has a shoulder section 32 and a pelvic section 34. The shoulder section 32 and the pelvic section 34 are separated from one another by a seat belt tongue 36. This seat belt tongue is preferentially configured such that it is blocked when a predetermined traction force is exceeded in the belt strap and thus uncouples the shoulder section and pelvic section of the safety belt from one another. Such a seat belt tongue is for example described in EP 1 983 857 B1 whose disclosure is hereby explicitly incorporated by reference. The length of the pelvic section consequently cannot be increased even upon the activation of the belt force limiter, so that retaining the pelvis in the desired position is improved.

In order to ensure that the passenger is belted, a detection system (not shown) is preferentially provided, which detects whether a passenger is sitting on the front passenger seat and produces a warning sound in case a passenger is detected who is not belted.

Figure 8:
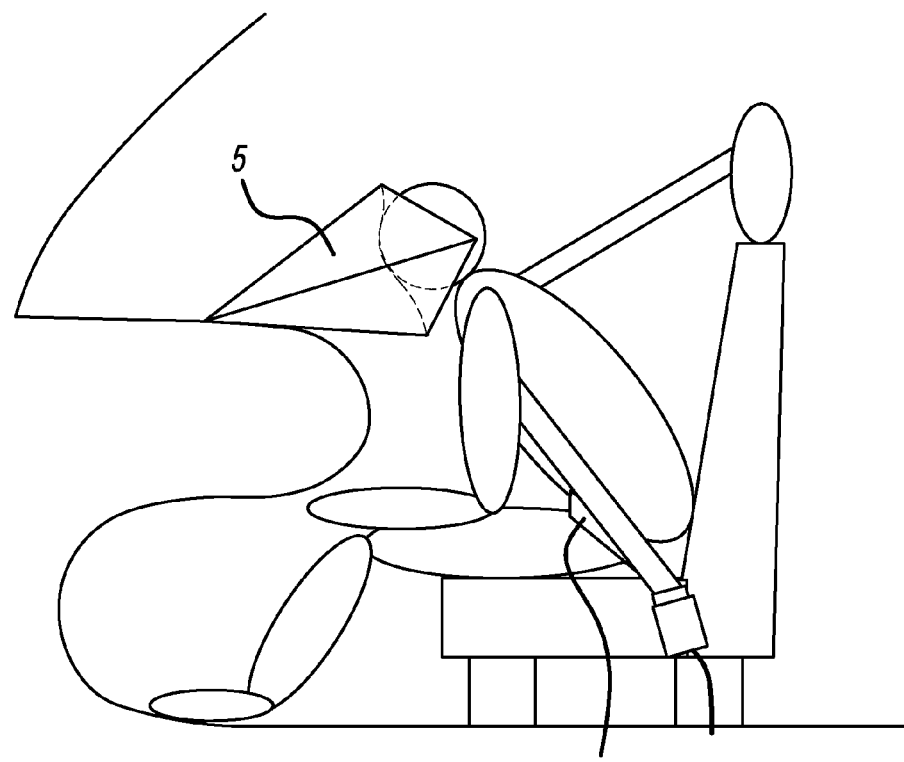
FIG. 8 shows the same as shown in FIG. 6 with the passenger plunging into the airbag envelope of the front airbag.
Figure 9:
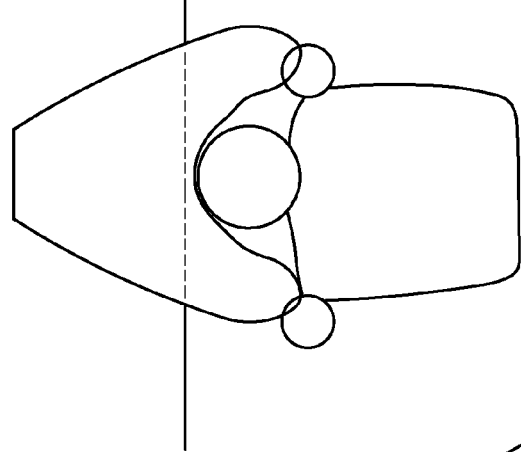
FIG. 9 shows the same as shown in FIG. 8 in an illustration corresponding to FIG. 4.

FIGS. 8 and 9 display the same as is shown in FIGS. 6 and/or 7 when passenger I plunges into the airbag envelope 10, namely into the impact area 11. It is evident that the pelvis of passenger I basically does not shift, owing to the pelvic section 34 of the safety belt 30, so that the upper part of the body of passenger I performs a tilting movement in the forward direction after the activation of the belt force limiter, the head being the foremost part of the upper part of the body and only this part being restrained by the front passenger airbag 5.

Figure 9A:
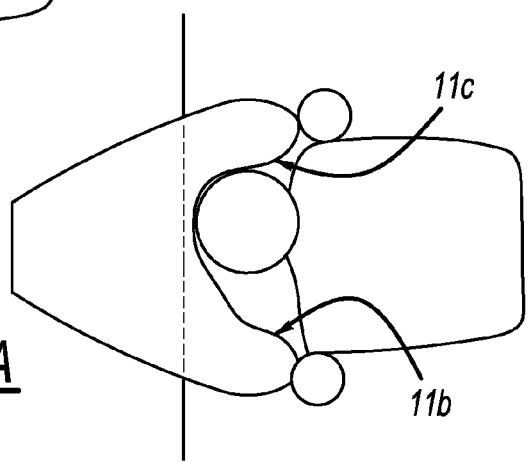
FIG. 9a shows the same as shown in FIG. 9 in case of a laterally displaced head-on collision.
Figure 10:
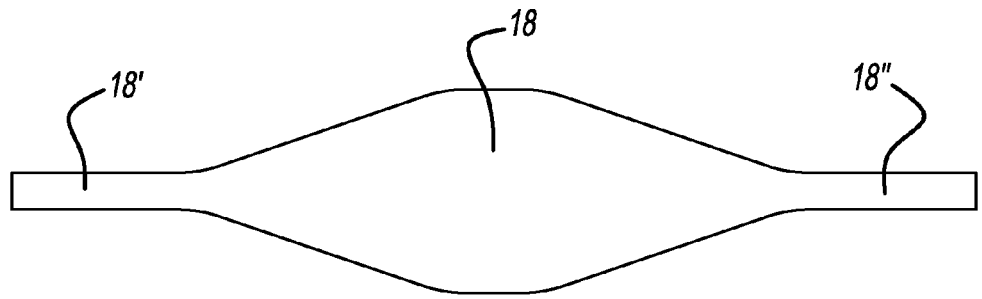
FIGS. 10 to 13 show alternative embodiments of the further pattern piece.
Figure 11:
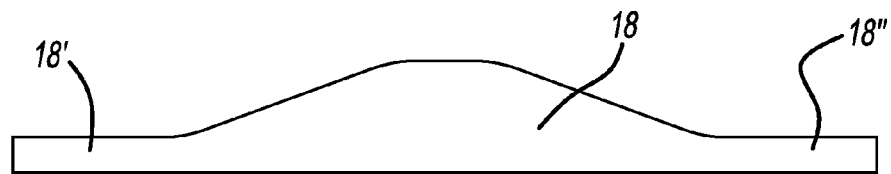

Owing to the concave shape of the impact area 11, the passenger's head is safely restrained even if it does not exactly meet the center of the impact area, as can be seen in FIG. 9a.

FIGS. 10 to 13 show different alternative shapes for the other cut pattern 18. As is apparent in particular from FIGS. 10 and 11, the other cut pattern 18 can have lateral areas 18', 18" which do not correspond to impact areas but are basically parallel to the longitudinal direction of the vehicle when the airbag envelope is expanded, and thus form a part of the lateral areas of the airbag envelope.

Figure 12:
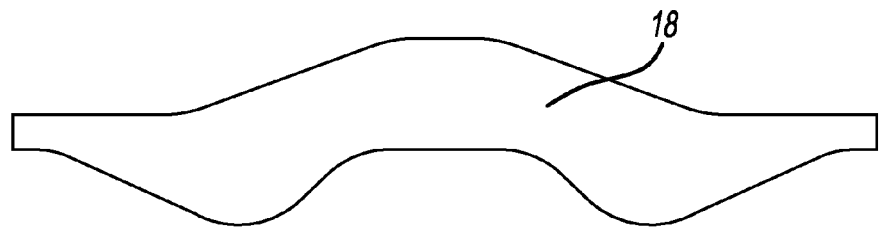
Figure 13:
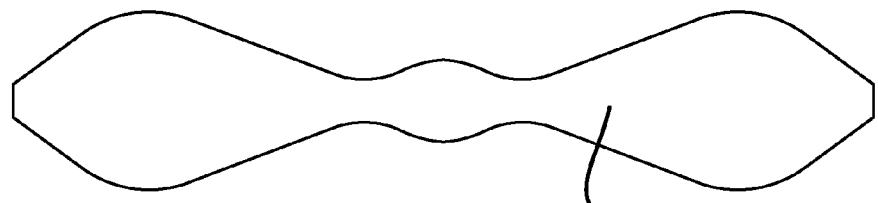

FIGS. 12 and 13 show that the other cut pattern can have strong contours, and consequently a particularly good adaptation to the shape of the instrument panel surface is achieved.

FIGS. 14a to 14e show a second embodiment of an airbag envelope which is based on the production process thereof. This airbag envelope also consists of three pattern pieces (FIG. 14a), two pattern pieces 41, 42 being congruent, however not the base and top pattern pieces but rather the left and right pattern pieces. Both pattern pieces 41, 42 are configured congruent in a kind of horseshoe-shape, and have one indentation each. The third cut pattern 43 is round in the shown exemplary embodiment.

Both first pattern pieces 41, 42 are first placed next to one another such that the indentations form a circular recess and the first cut pattern 41 overlaps the second cut pattern 42 in sections. Covered lines are shown as dashed lines. Both first pattern pieces are joined to one another in this state by means of the first seams 45. These first seams shown as dot-dashed lines are shear seams (FIG. 14b).

The circular recess is now closed by means of the third cut pattern 43 and sewn by means of the second seam 46. This seam is likewise a shear seam and is shown as a dot-dashed line. It is, however, also possible to configure this seam as a peel seam (FIG. 14c).

The now created work piece is folded along the folding lines (shown as dotted lines) 49 shown in FIG. 14c (FIG. 14d) and closed by means of the third seam 47 (shown in a dot-dot-dash pattern) at the edges (FIG. 14e). The impact area 11 thus obtains the desired concave shape with the left section 11b, the right section 11c and the central section 11a. FIG. 14a is a top view.

Figure 15:
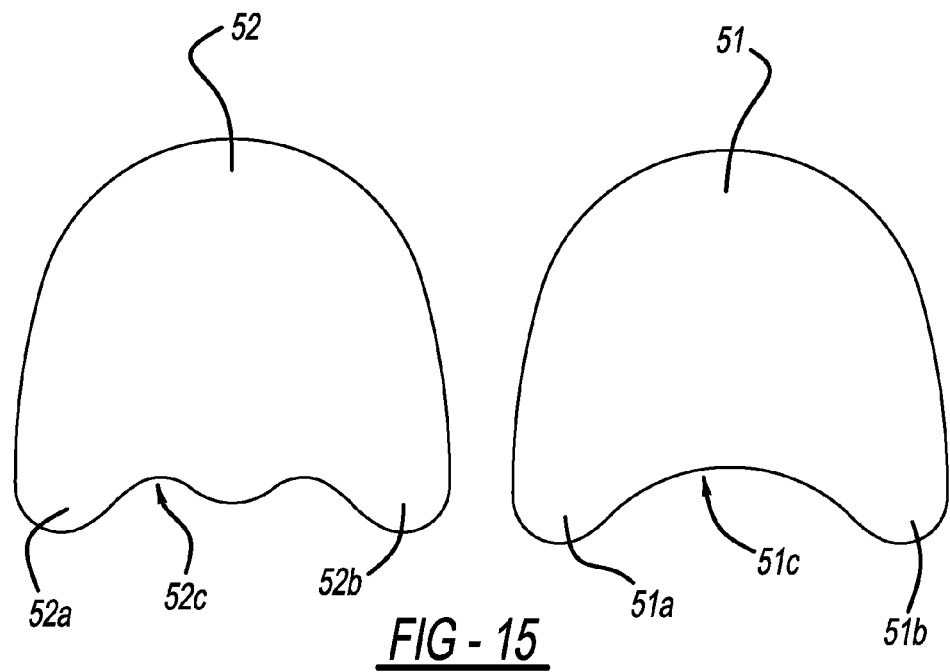
FIG. 15 shows two pattern pieces for a third embodiment of an airbag envelope.
Figure 16:
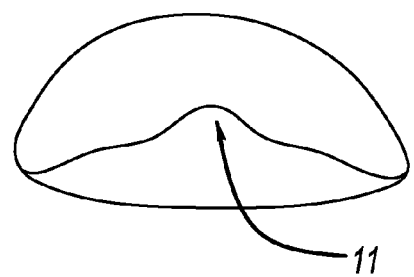
FIG. 16 shows the expanded airbag envelope assembled from the pattern pieces of FIG. 15.

FIGS. 15 and 16 show a third embodiment of an airbag envelope. It consists of two pattern pieces, which are designated as fourth and fifth pattern pieces 51, 52, and, as in the first embodiment, are top and base pattern pieces. The pattern pieces are not congruent, but the respective front edge 51c, 52c is concave in the fourth cut pattern 51 and corrugated in the fifth cut pattern 52. These pattern pieces also have forward protruding sections 51a, 51b; 52a, 52b. Both pattern pieces are joined all around, by sewing, for example. A concave impact area 11 results in the expanded state, as indicated in FIG. 16.

While the above description constitutes the preferred embodiment of the present invention, it will be appreciated that the invention is susceptible to modification, variation, and change without departing from the proper scope and fair meaning of the accompanying claims.

What is claimed is:

1. A front passenger safety arrangement for a front passenger in a seating position in which the front passenger's head is positioned at a height overlapping with a seat headrest, the front passenger safety arrangement comprising
   an airbag in an instrument panel facing an interior compartment of a motor vehicle, the airbag having an airbag envelope having an impact area with a central section and with lateral surfaces formed by a left section and a right section extending from the central section, the impact area being primarily allocated to an area of the front passenger's head and located substantially entirely above the instrument panel when the airbag envelope is fully expanded, the airbag having a concave shape when the airbag envelope is fully expanded and free of external forces, such that the left section and the right section respectively extend farther into the interior compartment of the motor vehicle than the central section, wherein the airbag primarily provides a restraining force for the passenger's head;
   a front passenger safety belt system with a pelvic belt portion and a shoulder belt portion, the shoulder belt portion primarily providing a restraining force against a forward-tilting movement of the upper torso part of the front passenger; and wherein the airbag provides a restraining force only for the passenger's head.

2. The front passenger safety arrangement according to claim 1, wherein the airbag envelope has a fully expanded volume of no more than about 60 liters.

3. The front passenger safety arrangement according to claim 2, wherein the fully expanded volume of the airbag envelope is between 35 and 50 liters.

4. The front passenger safety arrangement according to claim 1, wherein the lateral surfaces are formed at least in part by one top pattern piece and one base pattern piece, at least one of the top pattern piece and the base pattern piece having a concave edge which gives the impact area the concave shape.

5. The front passenger safety arrangement according to claim 4, wherein the impact area comprises a further pattern portion formed by another pattern piece or a part of another pattern piece which is held between the top pattern piece and the base pattern piece.

6. The front passenger safety arrangement according to claim 4, wherein the base pattern piece is configured to contact the instrument panel at least in sections when the airbag envelope is fully expanded.

7. The front passenger safety arrangement according to claim 4, wherein the base pattern piece has an opening for an inflator.

8. A motor vehicle comprising the front passenger safety arrangement according to claim 1.

9. The motor vehicle according to claim 8, wherein the safety belt system further comprises a detection system for an unbelted front passenger, the detection system being configured to generate a warning signal on detection of an unbelted front passenger.

10. The motor vehicle according to claim 8, wherein the safety belt system further comprises a seat belt buckle and a seat belt tongue separating the pelvic belt portion from a shoulder belt portion, the seat belt tongue configured to decouple the pelvic belt portion and the shoulder belt portion from one another when a predetermined threshold force is exceeded.

11. A front passenger airbag for arrangement in an instrument panel facing an interior compartment of a motor vehicle, the airbag comprising an airbag envelope having a top pattern piece, a bottom pattern piece and an impact area with a central section and with lateral surfaces formed by a left section and a right section extending from the central section, the airbag having a concave shape when the airbag envelope is fully expanded and free of external forces, such that the left section and the right section respectively extend farther into the interior compartment of the motor vehicle than the central section, wherein the impact area comprises a further pattern portion formed by another pattern piece or a part of another pattern piece which is held between the top pattern piece and the base pattern piece, the further pattern portion having a shape with a height and a width, wherein the height changes along the width of the further pattern piece.

12. The front passenger airbag according to claim 11, wherein the further pattern portion has a maximum height proximate the central section of the impact area.

13. A front passenger safety arrangement for a front passenger in a belted seating position in which the front passenger's head extends to a height exceeding a seat backrest height, the front passenger safety arrangement comprising
   an airbag in an instrument panel facing an interior compartment of a motor vehicle, the airbag having an airbag envelope having an impact area with a central section and with lateral surfaces formed by a left section and a right section extending from the central section, the impact area being primarily allocated to an area of the front passenger's head and located substantially entirely above the instrument panel when the airbag envelope is fully expanded, the airbag having a concave shape when the airbag envelope is fully expanded and free of external forces, such that the left section and the right section respectively extend farther into the interior compartment of the motor vehicle than the central section, wherein the airbag primarily provides a restraining force for the passenger's head;
   a front passenger safety belt system with a pelvic belt portion and a shoulder belt portion, the shoulder belt portion primarily providing a restraining force against a forward-tilting movement of the upper torso part of the front passenger; and wherein the airbag provides a restraining force only for the passenger's head.

* * * * *